US009576255B2

(12) United States Patent
Kalb et al.

(10) Patent No.: US 9,576,255 B2
(45) Date of Patent: Feb. 21, 2017

(54) METHOD AND APPARATUS FOR NETWORK CONTROLLED TICKET ACCESS

(71) Applicant: StoryCloud, Inc., San Diego, CA (US)

(72) Inventors: Kenneth J. Kalb, Solana Beach, CA (US); Michael W. Tracy, Solana Beach, CA (US); Thomas H. Buscher, Los Angeles, CA (US); Christina Liao, San Diego, CA (US)

(73) Assignee: STORYCLOUD INCORPORATED, San Diego, CA (US)

( * ) Notice: Subject to any disclaimer, the term of this patent is extended or adjusted under 35 U.S.C. 154(b) by 0 days.

(21) Appl. No.: 14/631,732

(22) Filed: Feb. 25, 2015

(65) Prior Publication Data

US 2016/0080390 A1    Mar. 17, 2016

Related U.S. Application Data

(63) Continuation-in-part of application No. 14/485,012, filed on Sep. 12, 2014.

(51) Int. Cl.
G06F 17/00 (2006.01)
G06Q 10/02 (2012.01)
(Continued)

(52) U.S. Cl.
CPC .............. G06Q 10/02 (2013.01); G06Q 50/01 (2013.01); H04W 12/08 (2013.01); H04L 2463/102 (2013.01)

(58) Field of Classification Search
USPC ............................... 235/375, 385, 384; 705/5
See application file for complete search history.

(56) References Cited

U.S. PATENT DOCUMENTS 8,041,610 B1 * 10/2011 Cirelli .................... G06Q 30/02
705/14.49
2010/0133339 A1 * 6/2010 Gibson .................. G06Q 10/02
235/382
(Continued)

FOREIGN PATENT DOCUMENTS

WO    2014005004 A1    1/2014
WO    2014029774 A1    2/2014
WO    2014047501 A1    3/2014

OTHER PUBLICATIONS

International Search Report and Written Opinion dated Dec. 7, 2015, regarding PCT/US2015/049817.
(Continued)

Primary Examiner — Ahshik Kim
(74) Attorney, Agent, or Firm — Arent Fox LLP

(57) ABSTRACT

The system provides a method and apparatus for providing controlled access to events, premises, transportation, and the like. In one embodiment, the system provides a ticket that is tied to a user and/or a device. The ticket in one embodiment comprises a dynamic link whose privileges and permissions can be controlled by a system controller so that use, re-use, and re-sale of the ticket can be controlled by the issuer and not by a purchaser or user. The system in one embodiment uses a reader/scanner associated with a controlled entrance that can receive tickets via scanning or some other form of electronic communication. In one embodiment, the system uses radio signals, such as Wi-Fi, Bluetooth, NFC (Near Field Communication) from a mobile device to determine if access should be granted.

10 Claims, 12 Drawing Sheets

(51) Int. Cl.
*G06Q 50/00* (2012.01)
*H04W 12/08* (2009.01)

(56) References Cited

U.S. PATENT DOCUMENTS

| | | |
|---|---|---|
| 2010/0176917 A1 | 7/2010 | Bacarella |
| 2011/0178827 A1* | 7/2011 | Orenstein .............. G06Q 30/08 |
| | | 705/5 |
| 2011/0202466 A1 | 8/2011 | Carter |
| 2012/0185394 A1* | 7/2012 | Gelfand ................ G06Q 10/02 |
| | | 705/44 |
| 2015/0154513 A1* | 6/2015 | Kennedy ................ G06Q 10/02 |
| | | 705/5 |

OTHER PUBLICATIONS

International Search Report and Written Opinion dated Jul. 15, 2016, regarding PCT/US2015/062191.

\* cited by examiner

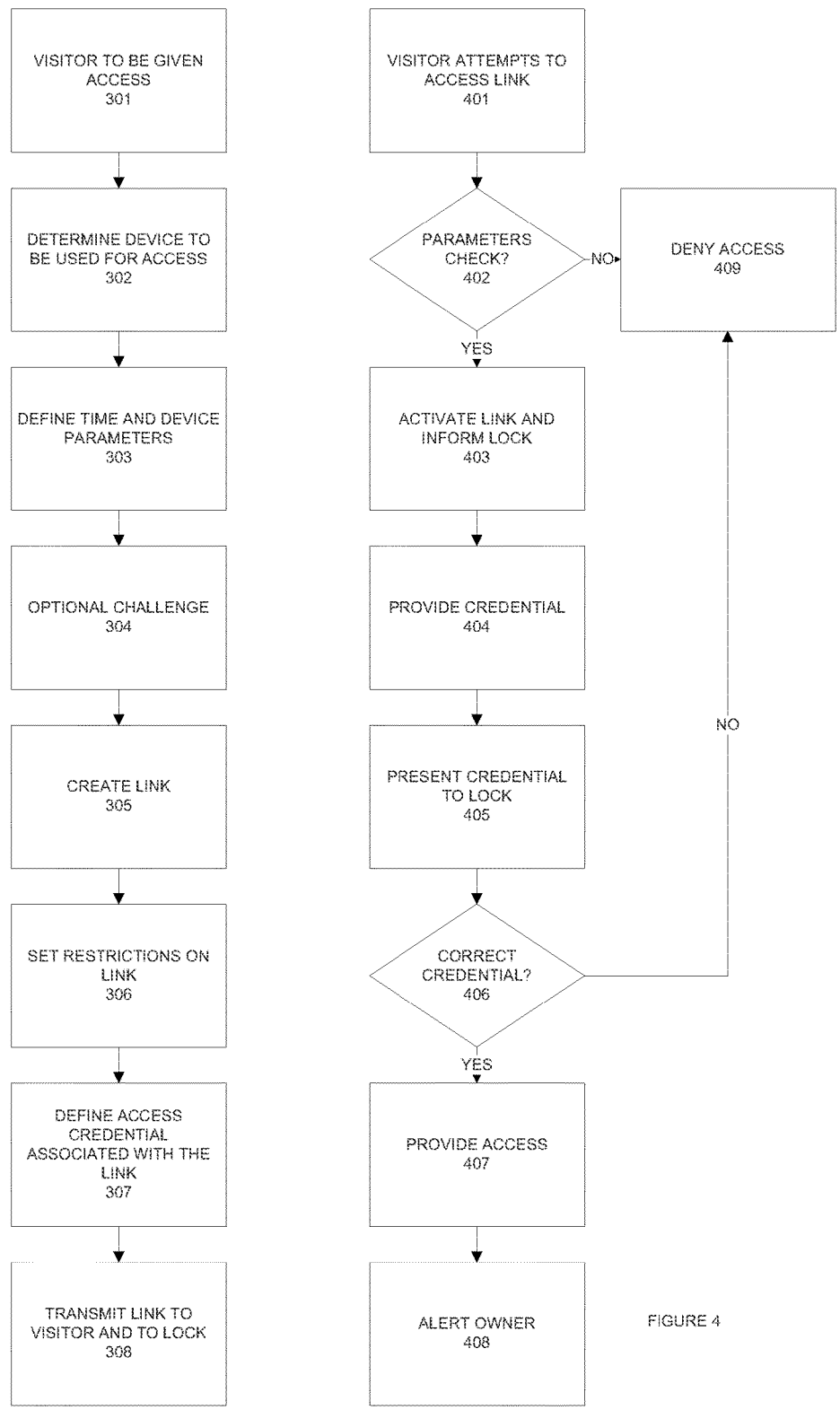

METHOD AND APPARATUS FOR NETWORK CONTROLLED TICKET ACCESS

This patent application is a continuation-in-part of U.S. patent application Ser. No. 14/485,012 filed on Sep. 12, 2014 which is incorporated by reference herein in its entirety.

BACKGROUND OF THE SYSTEM

There are many physical locations where it is desired to limit or control access. Typically this is accomplished by providing keys and/or pass codes to authorized visitors. For example, a homeowner and related family members may all have keys to the doors of their home. Sometimes a non-resident might have a key for emergency purposes. In a commercial space, the tenants or occupants may have some combination of keys, pass cards, access codes, and the like to permit entry onto the premises. Such entry may be at all times or may be restricted to certain time periods.

Whether residential or commercial, there are many instances where visitors, vendors, support personnel, repair people, delivery people, emergency personnel, first responders, medical professionals, military, government, and the like will need access to the premises. In the prior art, access is controlled a number of ways.

At the home, access may require that a family member be home to receive a visitor or vendor, so that desired services can be provided. This can create many disadvantages, particularly where the visitor cannot commit to a specific time of day. (e.g. cable companies may schedule a delivery time from 8 in the morning till 4 in the afternoon, with no commitment as to when within that time period they will appear). There may be trusted visitors who may be permitted in the home even without the presence of family members, but providing access either requires a family member to be present, or to somehow hide a key outside the home for retrieval by the visitor. In other instances, a visitor may be arriving late at night, and the family members may desire to provide access without waking up. There is no current process that provides a useful solution to these dilemmas.

In a commercial space, there may be a security station that allows visitors to be signed in, checked against a list of authorized visitors, and provided escorted access to the premises. Such a system requires full time security personnel to be available during the times of expected access, an expensive proposition. In addition, a tenant may forget to inform the security desk that the visitor is authorized, requiring last minute communication to resolve such problems.

In other instances, it may be desirable to limit and control the accessibility of events, such as concerts, movies, plays, and the like, to valid entrants. In the prior art, this has been accomplished through the use of tickets or passes. The ticket represents a right of entry to a location or event. The user of tickets immediately gave rise to the use of counterfeit or fraudulent tickets. To combat this, printers have adopted techniques used in currency control, particularly to make counterfeiting more difficult and expensive, and to increase the ease with which counterfeit tickets can be detected.

Another problem with physical tickets is the possibility of multiple use of the tickets for the same event. A user might enter the venue of the event, and then somehow pass the ticket back to the outside so that another user can enter the premises. A typical way of combating such misuse is to remove, mark, pierce or otherwise alter the physical ticket so subsequent uses can be easily detected and prevented. In other cases, tickets are marked with a readable code so that, via a scanner, a real-time inventory of use can be created and second uses can be detected and denied. Such codes can be bar codes, QR codes or other two dimensional codes, and the like.

Another disadvantage of current ticket schemes is the prevalence of so called "scalping" or resale of the ticket by the original purchaser, such that the issuer of the ticket does not benefit from the subsequent resale of the ticket. There have been many approaches to prevent the purchase of tickets by those who do not actually desire to use the tickets, or to prevent the resale of the tickets by the original purchasers. Because present tickets are a bearer type of document, it has not been possible to provide systems to prevent resale.

The use of tickets or entrance rights is not limited to events. Tickets or other credentials are typically used for mass transit of many types, including buses, subways, trams, taxis, trains, light rail, air travel, sea travel, and the like. Each of these carriers has developed methods for confirming and providing the right to travel on a conveyance at a certain time, for a certain distance, in a certain direction. However, many of these methods have the same problem as described above. Further, the purchase of tickets, tokens, boarding passes, and the like often result in crowds and delays at the point of embarkation, causing frustration and inefficiency.

SUMMARY

The system provides a method and apparatus for providing controlled access to events, premises, transportation, and the like. In one embodiment, the system provides a ticket that is tied to a user and/or a device. The ticket in one embodiment comprises a dynamic link whose privileges and permissions can be controlled by a system controller so that use, re-use, and re-sale of the ticket can be controlled by the issuer and not by a purchaser or user. The system in one embodiment uses a reader/scanner associated with a controlled entrance that can receive tickets via scanning or some other form of electronic communication. In one embodiment, the system uses radio signals, such as Wi-Fi, Bluetooth, NFC (Near Field Communication) and the like from a mobile device to determine if access should be granted.

The system contemplates the ability to provide tickets to a plurality of users via wired or wireless communication over a network. Each ticket is associated with one or more dynamic links so that distribution is a matter of creating or authorizing a particular user to access the dynamic link. The dynamic link controls who, what, where, when, and how long of the use of a ticket.

BRIEF DESCRIPTION OF THE DRAWINGS

FIG. 3 is a flow diagram illustrating the operation of an embodiment of the system in creating a credential for a visitor.

FIG. 4 is a flow diagram illustrating the operation of the system in providing access in one embodiment.

DETAILED DESCRIPTION OF THE SYSTEM

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The word "exemplary" is used herein to mean serving as an example, instance, or illustration. Any embodiment described herein as "exemplary" is not necessarily to be construed as preferred or advantageous over other embodiments. Likewise, the term "aspect" of an apparatus, method or article of manufacture does not require that all embodiments of the invention include the described components, structure, features, functionality, processes, advantages, benefits, or modes of operation.

The system provides a method and apparatus for providing controlled access to premises. In one embodiment, the system utilizes a number of components for operation, including an access control interface, a data controlled access portal, a communications infrastructure, a key emulator, and an authentication system. In one embodiment, the system uses dynamic links to provide temporary and controlled keys to a visitor. Because the visitor never has physical control of the virtual key, the key can be revoked or modified at any time, and even re-used if desired, simply be severing the dynamic link with the visitor.

Figure 1:
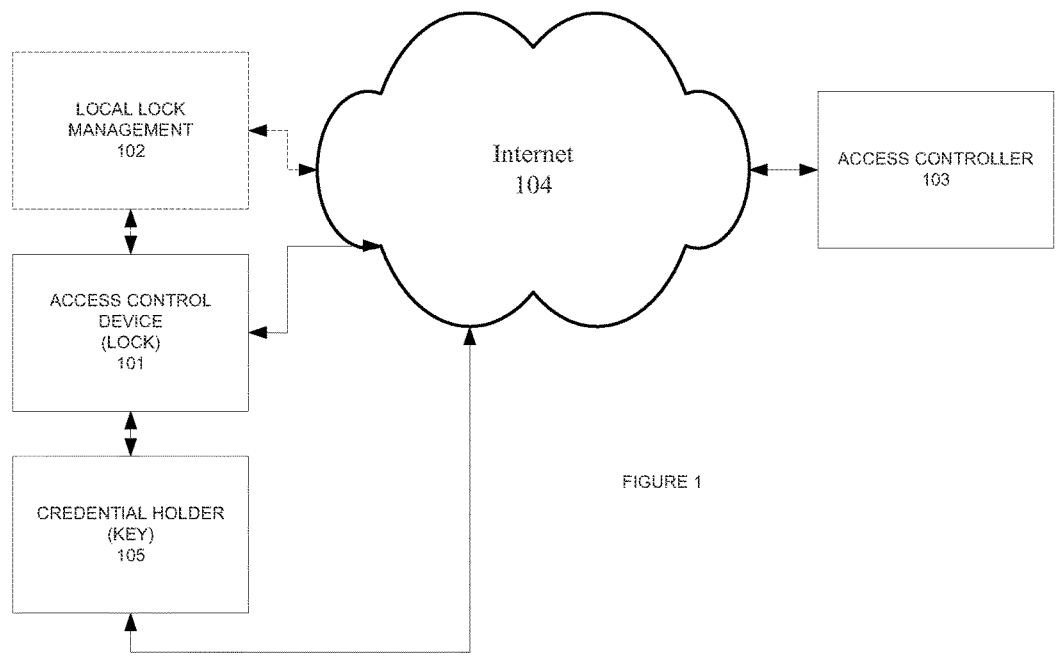
FIG. 1 is an example of an embodiment of a controlled access system.

FIG. 1 illustrates an exemplary embodiment of the system. The system comprises an Access Control Device 101, optional Local Lock Management module 102, Access Controller 103, Network 104, and Credential Holder (Key) 105. The Access Control Device 101 is used to deny and permit access to a visitor (i.e. Credential Holder 105). The Access Control Device 101 may be a lock at a location in one embodiment of the system. In other embodiments, it may be a set of instructions to a security checkpoint that provides a "sign-in" of an expected and permitted visitor to the location.

In one embodiment, shown as optional in FIG. 1, the Access Control Device 101 is coupled to a Local Lock Management module 102 (shown in dotted line). The Lock Management Module 102 is used to control the operation of Lock 101, allowing it to be opened when presented with an appropriate Credential Holder (Key) 105.

In operation, the Access Controller 103 is the entity that can provide permission for a visitor to access a location. The Access Controller 103 communicates with the Access Control Device 101 via the network 104. The Access Controller 103 determines if a visitor will have access to a location and then can send a credential to the Credential Holder 105 via network 104 and update the instructions of the Access Control Device 101 via network 104. The credential defines a date and time during which the credential will be active (i.e. able to open the Lock 101). The credential may be tied to a specific device, such as a mobile device (i.e. cell phone, table computer, touchpad device, or the like). In one embodiment, the system will use geo-location capabilities of the device to determine if the device is in fact in proximity to the access control device 101 before permitting the access to the location.

In one embodiment, the Access Controller 103 communicates permissions to Local Lock Management 102. Local Lock Management 102 then interacts with Access Control Device 101 to program it to respond appropriately to a credential from a Credential Holder 105.

Access Control Device

Figure 2:
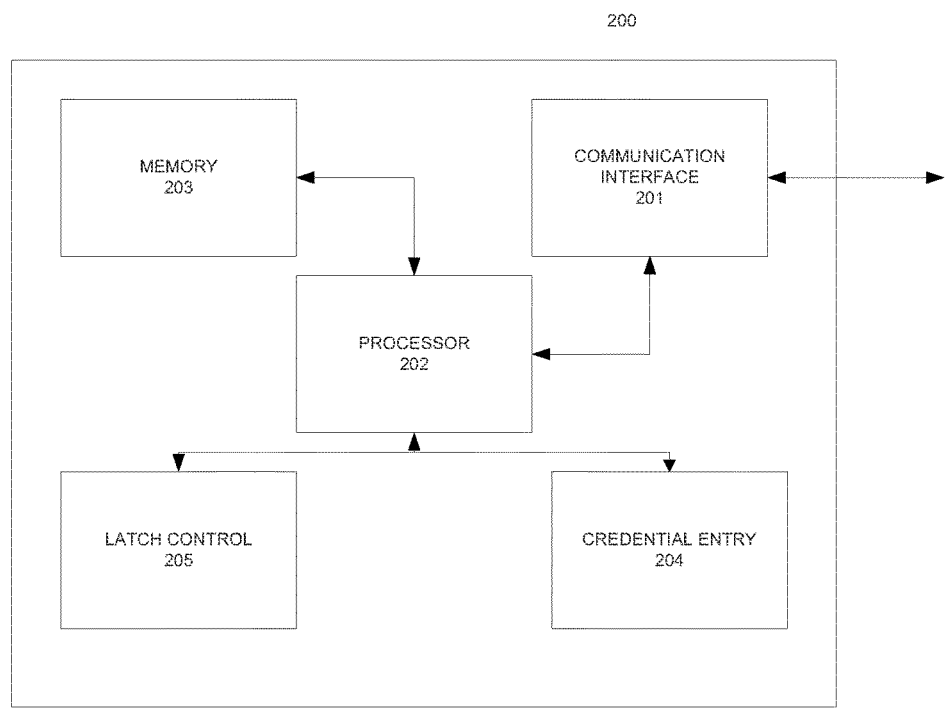
FIG. 2 illustrates an embodiment of an access control device.

The Access Control Device 101 is the means by which access to a location is controlled. This may be in the form of a lock on a door or gate, or it may be a security desk that is populated by one or more security personnel. In the embodiment where the system is implemented as a lock, a lock such as illustrated in FIG. 2 may be utilized. The Access Control Device 200 includes Communication Interface 201, Processor 202, Memory 203, Credential Entry 204, and Latch Control 205.

The Communication Interface 201 is used to facilitate communication between the Access Control Device 200 and other entities, via a network. The Interface can control both wired and wireless communication and can enable communication with the Access Controller 103, optional Local Lock Management 102, or other entities. The Device 200 includes a Processor 202 for implementing programs and other operations of the Access Control Device 200, including controlling Memory 203, Credential Entry 204, Latch Control 205, and Communication Interface 201.

Memory 203 is used to store programs for the operation of the Device 200, as well as data related to Credentials that are provided by the Access Controller 103 or Local Lock Management 102. Latch Control is used to engage or disengage the locking mechanism that prevents access to the location in response to a valid Credential.

Credential Entry 204 is used to receive Credential information from a Credential Holder 105. The data may be provided via scanning of a display, a keypad for entering a code, a Near Field Communication (NFC) link, Bluetooth wireless, Infrared, RFID, bar code, 2D bar code, QR code, and the like.

The system allows a person to allow visitors into a location or onto a property using a "temporary pass" or one time key. This is implemented through a credential that is provided to the expected visitor. The system implements a two-phase commit process. The two phase commit could be through separate communication paths or through the same communication path as desired.

Creating a Credential

FIG. 3 is a flow diagram illustrating the operation of an embodiment of the system in creating a credential for a visitor. For purposes of this example, the person or entity that has the right to grant premises access to a visitor is referred to as the "owner". This is not meant to imply property ownership, but rather the authorization to grant access to visitors. An owner may be one of a plurality of owners, each with varying levels of authority to grant permission of entry to visitors.

At step 301, an owner determines that a visitor is to be granted access to the premises. This may be based on a request by a visitor for access to the premises, via a regularly scheduled visitor, or via the owner requesting a visitor. At step 302 the system determines the device to be used by the visitor for access. This may be a smart-phone, a tablet computer, a pad computer, or any other uniquely identifiable mobile device. The device may be associated with a phone number and/or IP address so that it can be identified in a trusted manner. In one embodiment, the system requires that the future access be associated with a particular device in the possession of the visitor. This can reduce the ability to share access and to limit the possibility of fraudulent or unauthorized entry onto the premises.

At step 303 the system sets parameters associated with the entry of the visitor. These parameters include a time range of entry (e.g. the visitor may be given a time window in which access will be permitted. This may be done for a number of reasons. For example, the owner may not want to provide access to more than one visitor at a time, the owner may restrict access to a certain number of visitors in any one time period, or the user may desire that the visitor arrive for some time related purpose, such as a meeting. Other parameters associated with entry may include the device identification associated with the user, in/out permissions, an exit time, and the like. Another parameter may be the GPS coordinates of the device when attempting to access the lock. The system will require that the device be within some defined distance near the lock before the link will be allowed to be accessed by the visitor. In another parameter, the system may require that the access be via a wi-fi network associated with the lock. The wi-fi network itself may be password protected with the password unique to the visitor and also time controlled.

The access by the visitor may be asymmetrical, where ingress is controlled but access is open ended, or the access may be symmetrical, where both ingress and egress are controlled, logged, and require a valid access link to accomplish. This information will also be associated with the dynamic link.

At step 304 the system may establish an optional challenge to be presented to the visitor when access is attempted. This can be a passcode, password, or some other challenge and response that provides an extra layer of security to the access process. The challenges may be randomly generated or may be agreed to by the owner and visitor in advance. In some cases, a visitor may have an existing relationship and the challenge may require a physical totem of some kind, such as an encoded passcard. In other cases, the system may require the visitor to scan a fingerprint, iris, or other biodata and forward it to the system for later use in the challenge. Other challenges may include facial recognition, security question(s) passed on publicly available data, security questions based on previously provided personal data, or the like.

At step 305 the system creates a dynamic link to be used for access. The dynamic link will provide a key to the authorized device that will facilitate access to the premises. Restrictions are defined for the link at step 306. These restrictions include the valid time range of the link, whether a challenge is associated with the link, the authorized device to be used for access, and other relevant restrictions on the link. The link will only be valid during the defined time period.

At step 307 the system defines the access credential that will provide entry to the premises. This access credential may be a series of numbers and/or characters, it may be a credential that will provided to the lock via NFC, it may be a QR code, bar code, readable image, fingerprint display, 2D bar code, or other indicia that can be displayed and scanned from a mobile device.

At step 308 the system transmits the access information to the lock and sends an address to the link to the visitor. The address will not be valid until the defined access time and other parameters have been met.

FIG. 4 is a flow diagram illustrating the operation of the system in providing access in one embodiment. At step 401 the visitor attempts to access the link. At decision block 402 the system determines if the parameters associated with the link have been met. If not, the system denies access at step 409.

If the parameters have been met, the system proceeds to step 403 and activates the link. At this point, the lock is also notified that a bonafide user has been authorized to access the link, so the lock is then in a ready state to accept the appropriate credential. When the link has been established, the credential is provided at step 404. Because the system uses a dynamic link in one embodiment, the access credential doesn't reside on the visitor device but is made available only via the link. As noted above, the access credential may be an image, such as a QR code, bar code, biodata image, and the like.

At step 405 the visitor presents the access credential to the lock. This may be via presenting the display of the mobile device to a scanner or image reader, by activating an NFC exchange, by entering a code displayed on the mobile device on a keypad, or via some other suitable entry means. If the lock is connected wirelessly (ie. wi-fi, Bluetooth, radio, NFC, etc) the visitor's mobile device may be used to wirelessly supply access credentials without the need of visitor input on a physical apparatus. At decision block 406 it is determined if the access credential is the expected and correct credential. If not, the system denies access at step 409. If the access credential is correct, the system provides access at step 407. After step 407 or step 409, the system at step 408 sends an alert to the owner that with an update as to whether access has been granted or denied.

Figure 5:
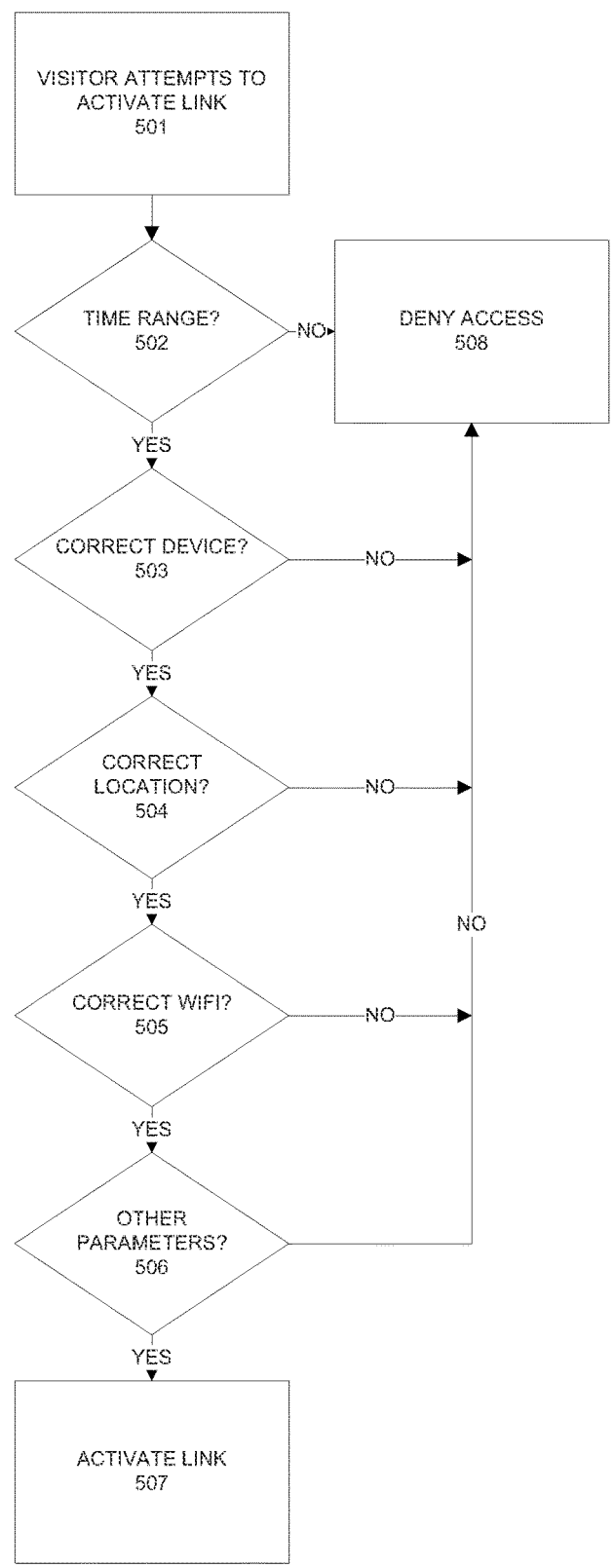
FIG. 5 is a flow diagram illustrating the operation of the system in determining if parameters have been met in one embodiment of the system.

FIG. 5 is a flow diagram illustrating the operation of the system in determining if parameters have been met in one embodiment of the system. At step 501 the visitor attempts to activate the dynamic link. At decision block 502 the system checks to see if the attempt to activate is made during the allowed time range. If not, the system denies access at step 508.

If within the time range, the system checks to see if the request for activation is coming from the correct device at step 503. This is accomplished by checking the IP address of the mobile device in one embodiment. In another embodiment, the system may check the phone number, serial number, device ID, UDID, IFA, IDFA, MAC address, IMEI, MEID, ESN, or any other suitable and trustworthy manner of device identification. If the device is correct, the system proceeds to step 504.

At step 504 the system uses device GPS indicators to determine the location of the mobile device. The location is compared to an allowed range of the device from the lock being accessed. If the mobile device of the visitor is within the prescribed range, the system proceeds to step 505. If not, access is denied at step 508.

At decision block 505, the system determines if the mobile device is communicating on the preferred wi-fi network. The system will provide to the visitor the correct wi-fi network to use along with access information. If the visitor is not using the correct wireless network the system denies access.

At decision block 506 the system determines if there are other parameters and if they have been met. As noted previously, these parameters could include challenges, physical tokens such as pass cards, bio-data, and any other parameters that can provide additional security and reliability to the owner.

If the visitor provides the correct other parameters at decision block 506, the system activates the link at step 507. Otherwise access is denied at step 508.

By utilizing dynamic links to provide the credentials and access credentials to use as keys in the lock, the system attains a number of advantages. One advantage is the automatic disabling of credentials when the time period associated with the lock has expired. The system also updates the access control device 101 to disable the ability of a particular credential to be used after the time period has expired. Thus, even if a visitor somehow captures the display generated by the link, the credential no longer works. In addition, the access control device is programmed to permit a credential to be used only once, with subsequent access attempts denied. Thus there is no need to create and manage a large number of physical keys, key cards, and the like, providing additional security.

Another advantage is the inability of incorrect mobile devices to access the dynamic links. This reduces the chance of an unauthorized visitor sharing the credential or somehow subverting the system by attempting to access a legitimate dynamic link.

Private Social Network

In one embodiment, the system may be implemented in a private social network. The private social network is comprised of a plurality of members. Each member can be classified, individually or in groups, by an administrator or an owner of a lock that can be controlled by the system. The access control device 101 can be programmed to admit any member of the private social network who has a classification or permission level that permits access to the premises. This allows the owner to easily and rapidly provide or deny admittance to a premises by reclassifying a network member appropriately. The operation of the lock requires that the visitor be an authorized member of the private social network as well as in the appropriate classification. Otherwise access is denied.

Figure 7:
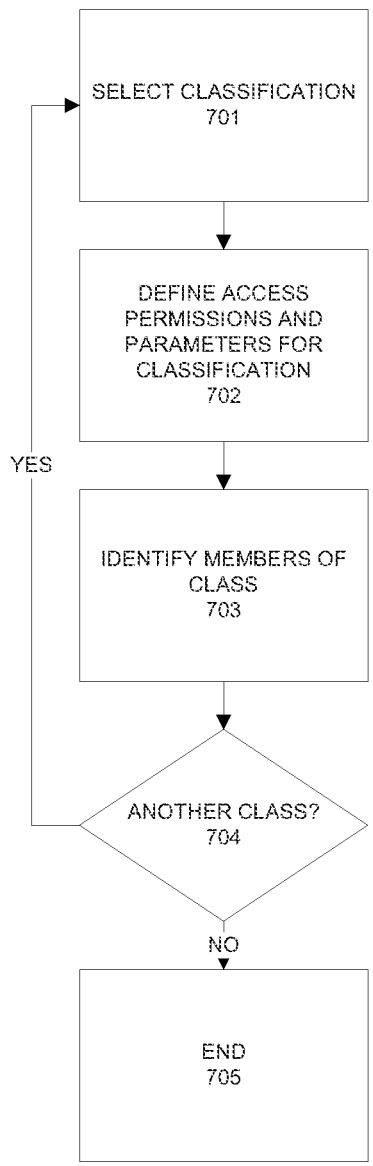
FIG. 7 is a flow diagram illustrating the operation of defining access classifications in a private social network in one embodiment of the system.

FIG. 7 is a flow diagram illustrating the operation of the system in connection with a private social network. At step 701 the owner selects a classification. This may be one of a plurality of available classifications or it may be a new class that the owner is creating. At step 702 the owner defines the access permissions and parameters for the classification. This can be time and device dependent, or it could have any of a plurality of parameters. In one embodiment, the system can take advantage of the ability of the private social network to track behaviour and other parameters, and use those metrics to define access privileges.

At step 703, the members of the private social network that are to be in the class are determined and added to the class. At decision block 704 the system determines if there is another class to be defined or modified. If so, the system returns to step 701. If not, the process ends at step 705.

Figure 8:
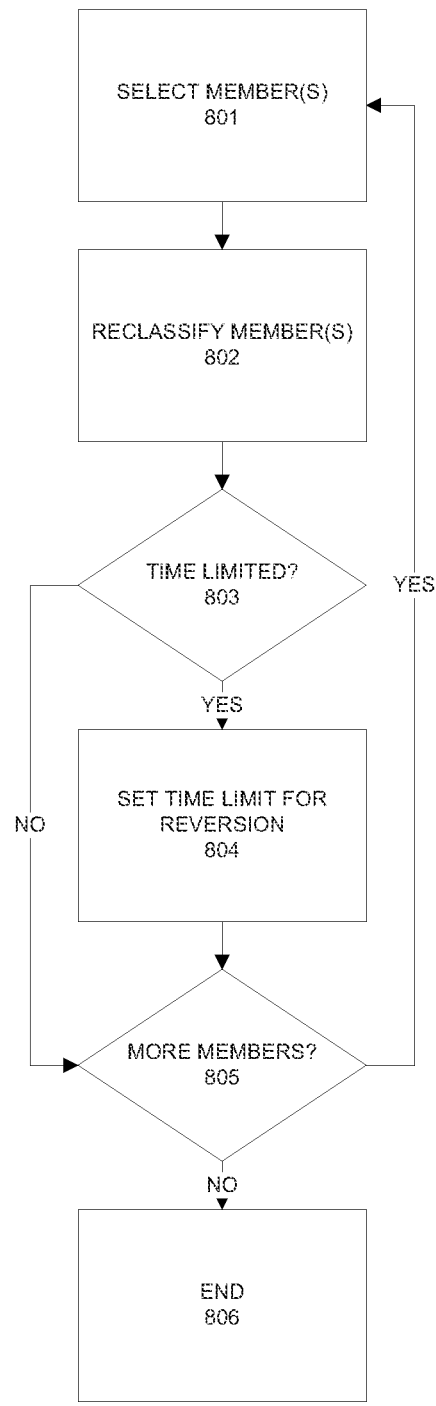
FIG. 8 is a flow diagram illustrating the reclassification of a member of a private social network in an embodiment of the system.

FIG. 8 is a flow diagram illustrating the reclassification of a member of a private social network in an embodiment of the system. At step 801 the owner selects a member or a group of members whose access permissions are to be changed. This may be accomplished by manually selecting one or more members to be modified, and/or by selecting a particular class of members of the private social network.

At step 802 the owner reclassifies the selected member(s). This may be accomplished by assigning them to a different class, or by manually defining the parameters to be used in providing access to the premises. At decision block 803 it is determined if the reclassification of the member(s) is to be permanent or time limited. If the changes are to be time limited, the system proceeds to step 804 where the owner sets the time limit for the reclassification, after which the member(s) will revert back to their previous class.

If there is no time limit at 803, or after the time limit is set, the system proceeds to decision block 805 to determine if there are more members to classify. If so, the system returns to step 801. If not, the process ends at step 806.

An advantage of using the private social network to control access is the ease by which a changing membership can be accommodated. For example, the private social network could be associated with a place of work. When a new employee joins, there is no need to create pass cards and to update the system to accept the new user. The new employee can just be give access to the private social network at the appropriate classification and can use their own smart-phone as their pass card. Similarly, when an employee leaves, the owner simply removes them as an authorized member of the private social network, eliminating future access by that person. Each floor, elevator, and room can have different permissions for each class of employee, so that it is easy to control access accordingly.

The private social network utilizes dynamic links to provide data and content to the user. Because the access credential never resides on the mobile device of the member, there is no risk of access by the user once the dynamic link has been disabled. All of the safeguards and restrictions described above may also be employed in the private social network embodiment. The private social network embodiment may also be used in non-employment situations, such as fraternities, parties, family members, and the like. The credentials can be made available temporarily, such as to a babysitter, or other vendor, by providing temporary membership in the private social network at the appropriate class level.

The ability to modify access is not limited to time, device, or challenges. In particular, in the setting of the private social network, the access parameters by be more robust and conditional. For example, access may be conditioned to accomplishments that can be tracked in the private social network. Access may be limited to members who have visited to particular locations prior to seeking access. The private social network can track user access to the other locations using previous grants of access or by using geo-location data associated with the mobile device of a member. Access may also be tied to other networked items. For example, the private social network may be used to access data from an exercise tracking device, such as Fitbit™.

Figure 9:
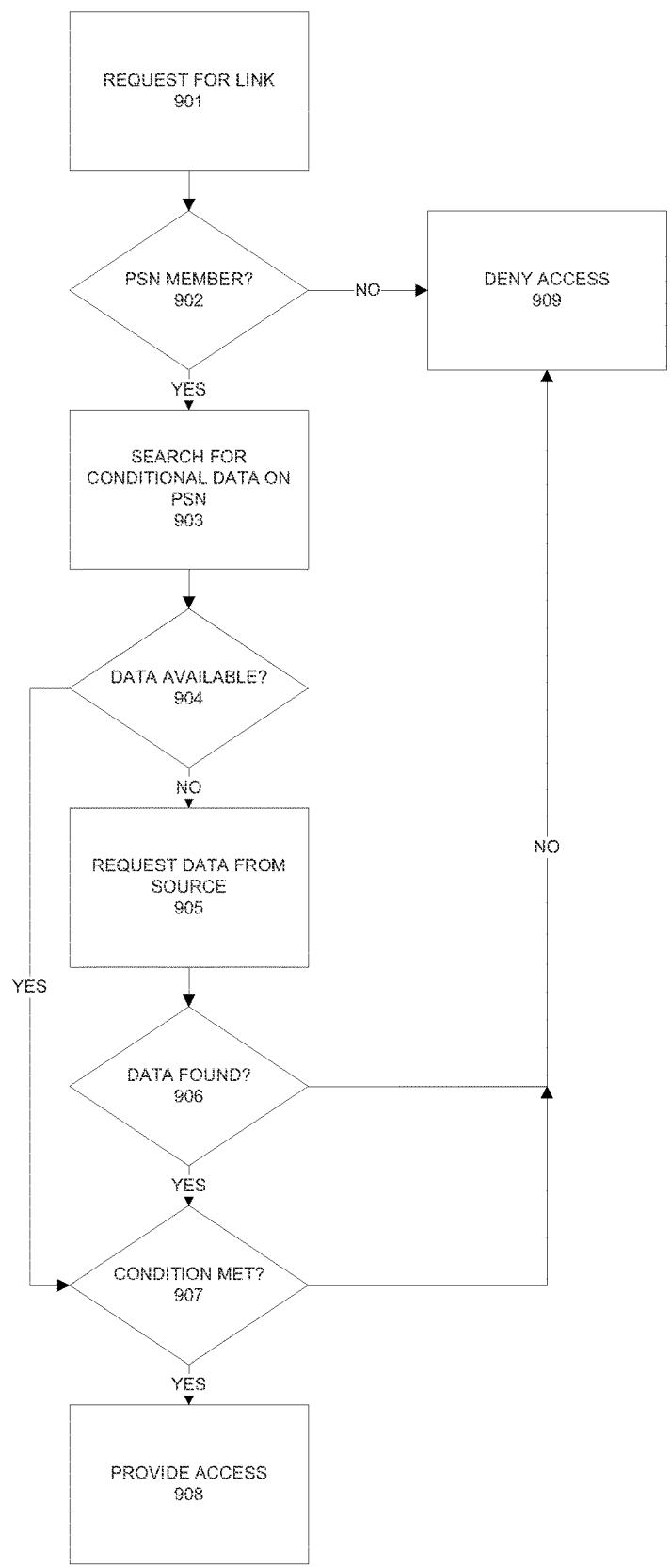
FIG. 9 is a flow diagram illustrating the use of conditionals for access in an embodiment of the system.

FIG. 9 is a flow diagram illustrating the use of conditionals for access in an embodiment of the system. At step 901 a request for access is presented. At decision block 902 it is determined if the visitor is a member of the private social network (PSN). If not, access is denied at step 909. If the visitor is a network member, the system searches for the requested conditional data on the private social network at step 903. This data could include historical behaviour patterns, geo-location information, accomplishments, characteristics, and other data that may have been defined as a condition of access. At decision block 904 it is determined if the conditional data is available on the PSN. If not, the system proceeds to step 905 and requests data from the needed source.

The needed source may be a networked device such as a Fitbit, or some other device that can provide the required conditional data that is being sought. At decision block 906 it is determined if the requested data has been found. If not, the system denies access at step 909.

If the data is available at steps 904 or 906, the system checks to see if the conditions have been met at decision block 907. If so, the system provides access at step 908. If not, the system denies access at step 909.

The conditional data may be based on historical geo-location data. The system could track the locations that a user has been as well as the length of time that the user has been in one or more particular locations. For example, there may be a requirement for access to a certain location that a soldier has been in Iraq for a certain amount of time, as evidenced by geo-location data obtained from the user's mobile device.

The conditions requested at step 903 could be tied to other tasks and accomplishments. Consider a job that requires certain achievements or accomplishments before access to a particular building. For example, military training, lab training, or other training that can be presumed or confirmed by physical presence at a particular location. Such a condition must be met before allowing access to a facility, lab, range, or the like. The physical presence condition may be a supplemental check of credentials, or it may be an automated way to control access until a user has satisfied the location conditions of the facility.

Dynamic Links and Controlled Data Access

The system includes additional protection for credentials that allows the owner/issuer of the credentials to determine and fully control who, what, where, and when/how long a credentials file is being shared, and this is implemented using dynamic links. The creator of a credential will have the ability to set granular controls, permissions, and limitations on the use and accessibility of the credentials or digital asset. Regardless of whether the credential is to be shared within or without a PSN system, the issuer can set limits to particular users, classes of users, or other access levels related to the credentials.

The issuer can set default options that may apply to all credentials that are created, with the issuer then adjusting settings as desired to provide more or less access to the credentials. Table 1 gives examples of the types of permissions that can be applied to credentials using the system.

TABLE 1

| Start Time | End Time | Location | PSN Member | PSN System Member |
|---|---|---|---|---|
| Link Count | Modify File | Share Link | Analytics | Password Protect |
| Repeat Views | Event Tie-in | Outsider | Device Limits | Financial |

The Start Time defines when the credentials will be available. This allows the user to set up permissions that will make credentials available in the future so that credentials can be scheduled in advance, without releasing the credentials. A link that is associated with the credentials will not operate if the Start Time has not yet occurred. The End Time defines when the access to the credentials will be terminated. The default for the Start Time may be that it is available upon uploading to the system and the End Time is open ended. The credentials owner is free to set any defaults for uploaded credentials. In one embodiment, the defaults may be tied to credentials type, with specific default profiles for text, audio files, video files, images, etc.

The Location setting may be used to set a geographical limitation on where the link to the credentials will be effective. For example, the credentials owner may only make the credentials link active at a specific location, such as a store, home, park, business, or the like. The system allows the owner to define a distance from a location in which the credentials link will be usable. The credentials owner may also limit access to the link to a PSN Member, a PSN system user, or it may be available to outsiders. The owner may require an outsider to register with the PSN system in order to be able to access the credentials link. In one embodiment, the credentials owner can access a map and use it to define a location at which credentials may be either viewable or prohibited, as desired. The user will also be able to use addresses, zip codes, or other location metadata to define protected geographical regions. Once a location has been determined, the credentials owner can use a slider or some other means to define the radius about which the credentials is available. In other embodiments, the user can define the region by drawing a boundary on the map, so that non-circular regions may be defined.

The Link Count can be used to set a number of times the link can be used to access the linked credentials. When the Link Count is exceeded, the link is rendered inactive. Repeat Views may be used to allow a user of the credentials link to use it more than once or to be limited to a single access. The Device Limits setting may be used to restrict access to the credentials link to a type of device either generically (e.g. a smart-phone), by producer (e.g. an Apple device), or even to restrict access to a single device, by tying access to a particular UDID or some other indicia that can be used to reliably identify a particular device. The link count can be bounded by number of impressions, unique views, particular user, time period, duration, and the like.

The credentials link may be password protected in that a person accessing the link will need to provide a password or respond to some other challenge before access to the link is given. The credentials owner can set the link to track and provide Analytics associated with use of the link, including identity of who accessed the link, how many times, for how long, and the like. The Share Link setting can be used to allow or restrict sharing of the link with others. If the link is sharable, all of the restrictions associated with the link stay with the link, so that protection is maintained.

The share link may be transmitted or communicated in any of a number of ways, including email, phone number, SMS, text, or any other suitable manner. The credentials In some cases, the credentials owner may permit the user of the link to modify the credentials. This ability to modify the credentials may add another level of restrictions on who can modify, or it can apply to all users. The ability to modify can be parsed to one or more of a plurality of modification options, including overwriting, editing, adding audio, and the like.

The credentials link can have a connection to other events, such as a concert, sporting event, or other event, where the beginning and/or end of the event will define the accessibility of the credentials link. In one embodiment, the credentials link can have a financial component where a viewer may be required to pay for either viewing or to expand other permissions associated with the credentials link.

Figure 10:
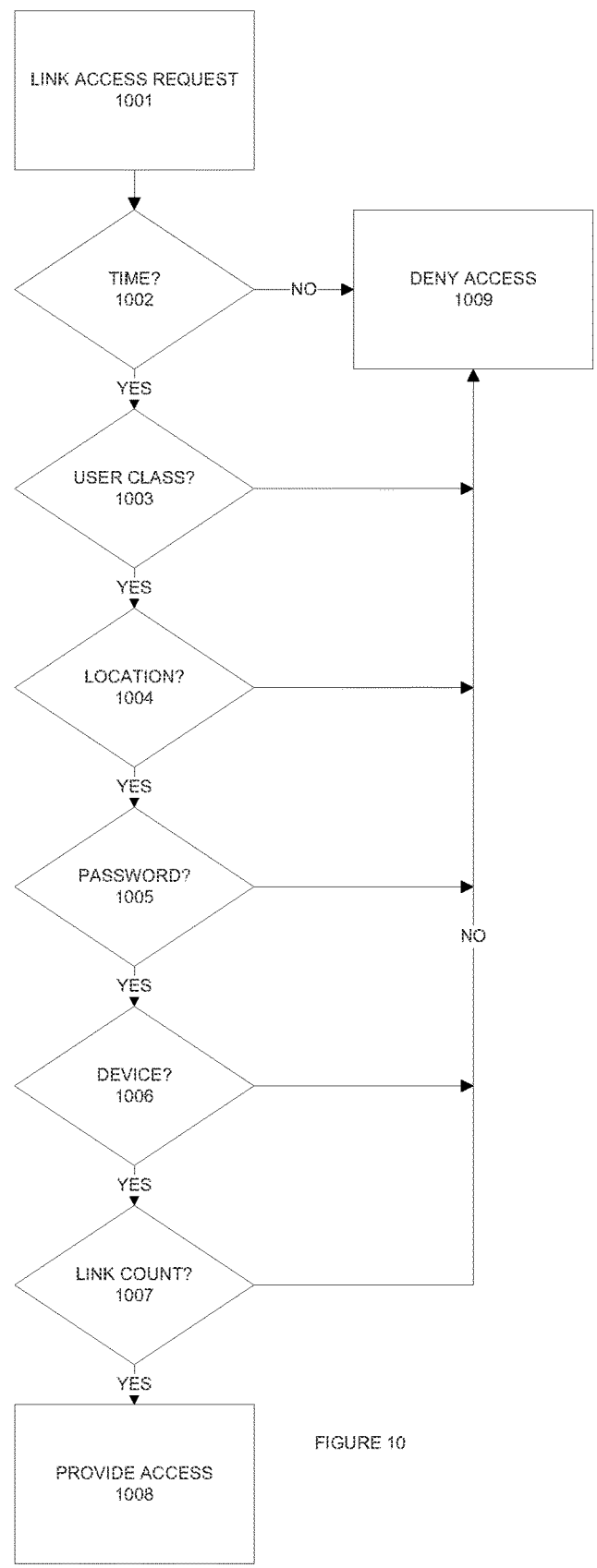
FIG. 10 is a flow diagram illustrating the operation of the system in providing access to content via a link in one embodiment.

FIG. 10 is a flow diagram illustrating the operation of the system in providing access to credentials via a link in one embodiment. At step 1001 someone makes a request to access the credentials link. At decision block 1002 the system determines if the attempt to access the link is being made during the active time frame of the link. As noted above, this can be a fixed start and end period, or it may be tied to an event or some other time dependent trigger. If the access is not timely, the system denies access at step 1009.

At decision block 1003 the system determines if the user attempting access is in the approved user class as determined by the creator of the link. If so, the system proceeds, if not, access is denied. At decision block 1004 it is determined if there is a location restriction and if so, if the user is within the designated geographic location for accessing the link. This may be determined by geo-location information provided by the access device of the user (e.g. smart-phone). At decision block 1005, if there is a password requirement, the system requests it and checks for the proper password. If the password is not correct, the system may provide a certain number of retries. If the user fails to provide the password, access is denied.

At decision block 1006 it is determined if there is a device requirement for access, and if so, whether the user is accessing the link on the correct device. This can be determined by IP address, UDID, MAC address, or some other reliable indicator of the device being used. At decision block 1007 it is determined if the access request is within the number of allowed link requests. This number may be on a per-user limit or a total access limit for the link, as defined by the creator of the link. If the decision blocks are not satisfied, access is denied. If all are satisfied, the system provides access to the link at step 1008.

When the viewer has access to the credentials, there are still restrictions associated with the credentials. The credentials is shared via the link, and is not resident on the viewer's device. Screenshot capability on the device is disabled to prevent the credentials from being captured by the device. Saving and forwarding the credentials is prohibited, although forwarding the link may be permitted. In some cases, the credentials may be modifiable by the user, depending on the permissions set by the credentials owner. In addition, the files will typically be encrypted to further provide protection.

The system allows the owner of credentials to have many levels of control and management over the credentials. By requiring all credentials to be accessed by link, the system allows a credential owner to permanently remove credentials by eliminating the link to the credentials.

In one embodiment, the system implements the credentials links via an index node, referred to as an inode. The inode is a data structure that is used to represent an object (which can be any type of digital credentials). The inode includes attributes which can be used to characterize access to the referenced object, including access permissions, manipulation controls, and other credentials management metadata.

It is possible to have a plurality of inodes pointing to the same underlying data file (credentials). This allows the credentials owner to further customize access and manipulation possibilities of the underlying credentials. The credentials may be stored in "collection groups". A particular credentials or resource may be found in more than one collection group.

Figure 11:
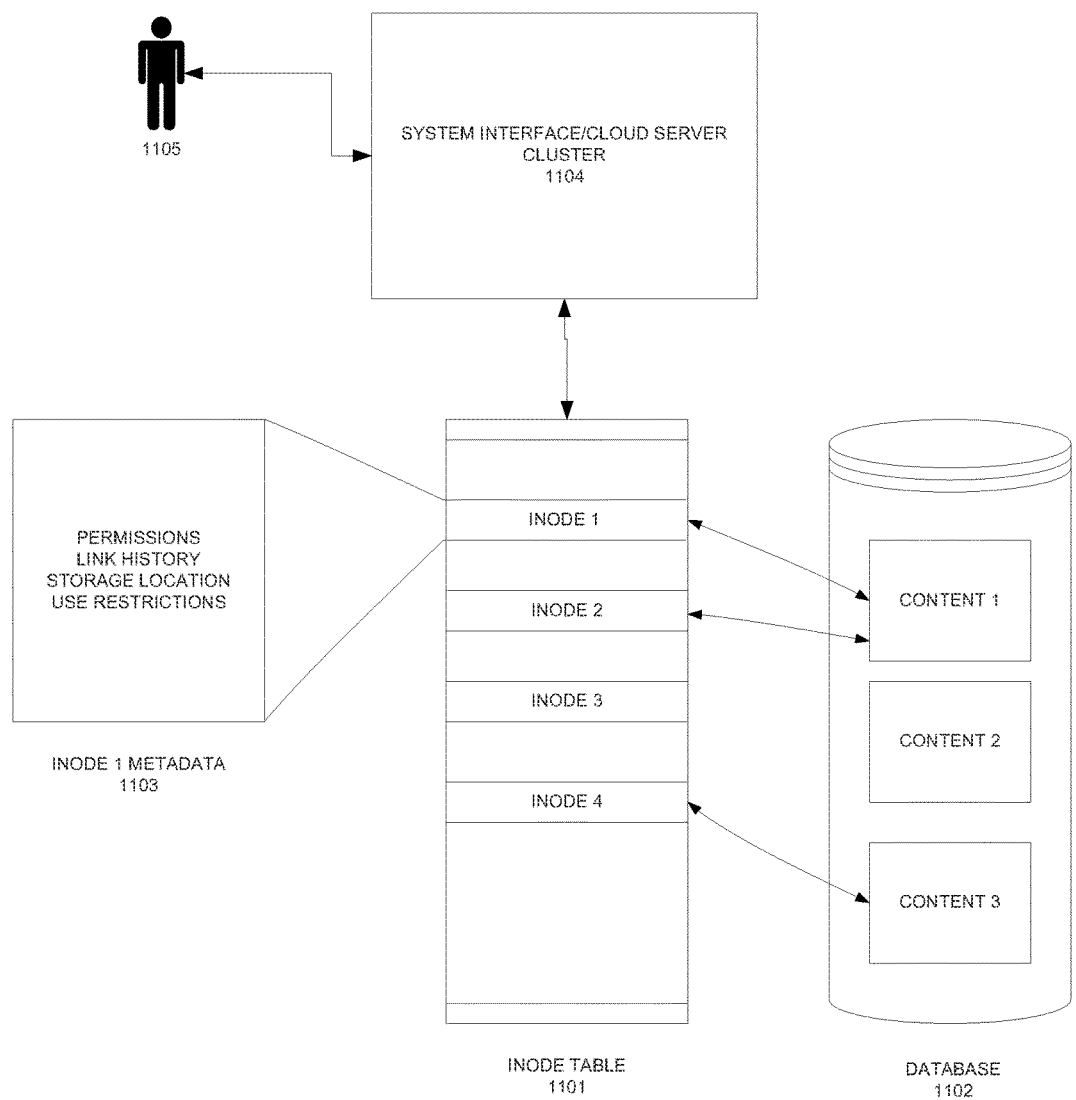
FIG. 11 illustrates an example of the sharing of content in one embodiment of the system.

FIG. 11 illustrates an example of the sharing of credentials in one embodiment of the system. A user 1105 attempts to access a credentials link by communicating in the system through a system interface (e.g. PSN) at system interface/cloud server cluster 1104. The server cluster 1104 includes an inode table 1101 that stores a plurality of links/inodes such as inodes 1-4. A database 1102 is coupled to the link table and stores a plurality of credentials, such as Credentials 1, Credentials 2, and Credentials 3.

Inode 1 is illustrated in more detail in inode 1 metadata block 1103. An inode includes permissions, link history, storage location of the credentials, use restrictions, and other metadata and control information that can be used by the credentials creator as described above.

As shown in FIG. 11, a particular credentials may be associated with one or more inodes. For example, Credentials 1 is associated with inode 1 and inode 2. Each inode can have its own associated permissions, access rules, modification rules, and the like. The credentials owner can create as many links or inodes to the same credential as desired, with each one being customized accordingly.

Dynamic Link Tickets

In one embodiment, the system provides a method and apparatus for issuing tickets. The tickets may be for an event (e.g. concert, movie, play, exhibit, sporting event, and the like), transportation (e.g. subway, train, bus, and the like), an attraction (e.g. amusement park, water park, museum, and the like), or any situation where a unique ticket or credential is required. A ticket may be likened to a credential as described above, but for purposes of this embodiment, may be referred to interchangeably as a ticket or a credential.

The system takes advantage of the dynamic links to create a virtual ticket that provides safeguards against forgery and fraud, and with the additional advantages of limiting or preventing resale or secondary market if desired. In one embodiment, the issuer of the ticket may also provide a secondary market for the disposition of tickets so that the issuer, performer, team, and the like can maximize compensation both of the initial transaction and subsequent transactions.

In one embodiment, the system may create an association between the ticket and a device that is associated with the purchaser of the ticket, so that the ticket is valid only when used with the device.

Figures 12, 13:
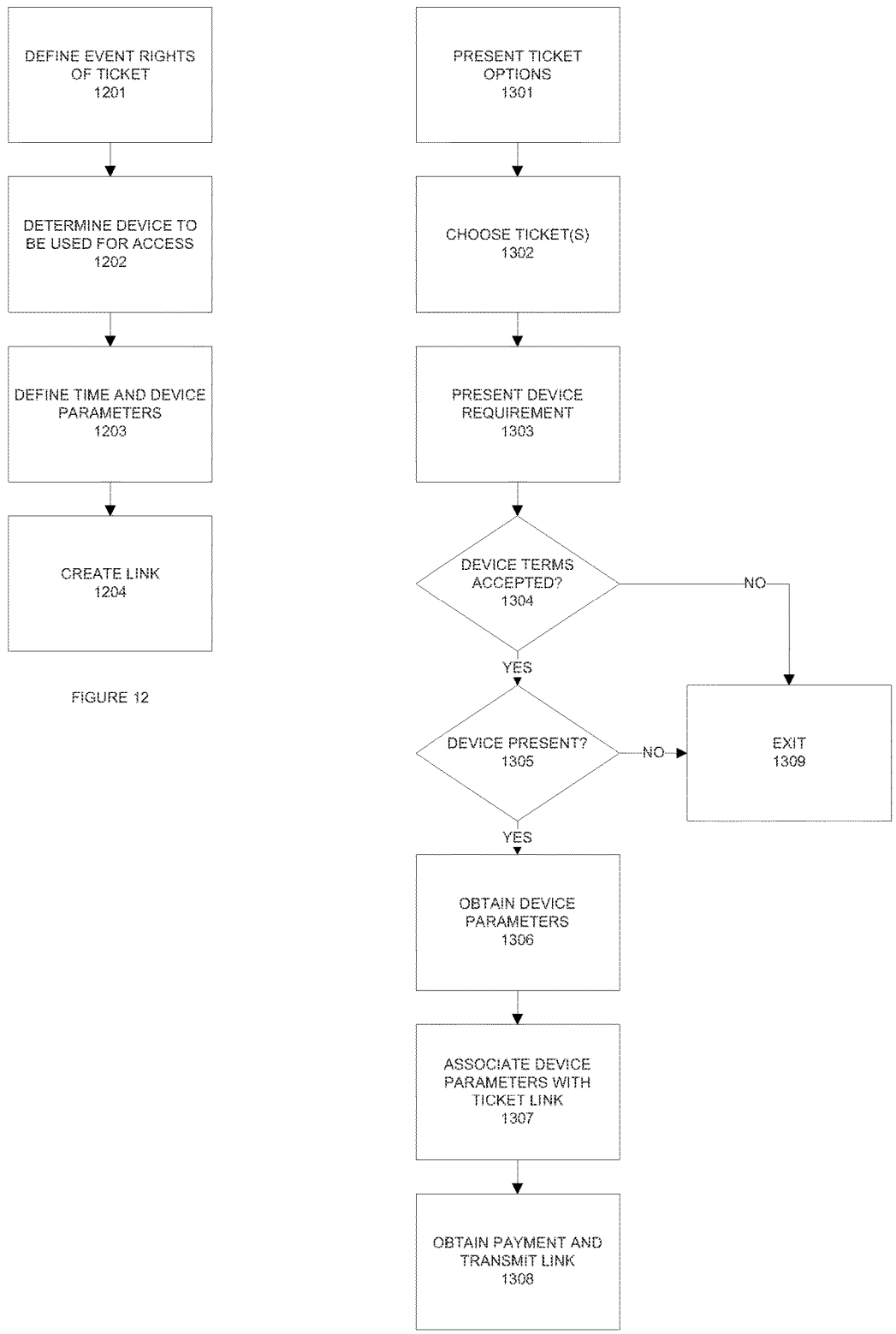
FIG. 12 is a flow diagram illustrating the generation of a ticket in an embodiment of the device.
FIG. 13 is a flow diagram illustrating a transaction of a ticket in one embodiment

FIG. 12 is a flow diagram illustrating the generation of a ticket in an embodiment of the device. At step 1201 the system defines the event rights of the ticket. This is to determine what rights the purchaser of the ticket will be provided. For example, the ticket may be for a specific seat designation (e.g. row, section, and the like). In some cases, a ticket may not have an associated seat location, but might be a general admission ticket, an open seating ticket, a ticket to an exhibit where patrons do not necessarily sit, and the like.

At optional step 1202, the system may define that a particular device is the device to be used with the ticket. This may be a smart-phone, a tablet computer, a pad computer, or any other uniquely identifiable mobile device. The device may be associated with a phone number and/or IP address so that it can be identified in a trusted manner. In one embodiment, the system requires that the future access be associated with a particular device in the possession of the visitor. This can reduce the ability to share access and to limit the possibility of fraudulent or unauthorized use of the ticket and limit the secondary market of the ticket. If a mobile device is required, the purchaser will be warned that the device must be present at the time of entry or the ticket will not be honored.

At step 1203 the system sets parameters associated with the ticket. These parameters include a time range of entry (e.g. the ticket holder may be given a time window in which access will be permitted). Other parameters associated with the use of the ticket may include the device identification associated with the user, in/out permissions, an exit time, and the like. Another parameter may be the GPS coordinates of the device when attempting to use the ticket. The system requires that the device be within some defined distance near the use location of the ticket before the link will be allowed to be accessed by the ticket holder. In another parameter, the system may require that the access be via a particular wi-fi network associated with the event or premises. The wi-fi network itself may be password protected with the password unique to the ticket holder and also time controlled. In other instances, the ticket will appear as an image on the display of the mobile device and be scanned at a point of entry or use of the ticket. This ticket may be a series of numbers and/or characters, it may be a QR code, bar code, readable image, fingerprint display, 2D bar code, or other indicia that can be displayed and scanned from a mobile device.

At step 1204 the system creates a dynamic link to the ticket. The ticket may be accessed by the link. Both access to and/or use of the ticket may have time restrictions applied. For example, the purchase may be given the link but the link may not be active until some time frame close to the ticketed event. In another embodiment, the link may be instantly active so that the purchase can download the indicia representing the ticket, but the ticket itself is not usable until some certain time frame has occurred.

Ticket Transaction

FIG. 13 is a flow diagram illustrating a transaction of a ticket in one embodiment. At step 1301 the system presents ticket options. This includes the event or exhibit, date, time, available seats and seating map (when appropriate), pricing, and the like. At step 1302 a purchase chooses one or more tickets. The system may set a limit on how many tickets a user may purchase to prevent or make difficult the ability of a scalper or broker to obtain meaningful numbers of tickets.

In one embodiment, at step 1303 the system presents the device requirement to the user. This means that the ticket will be associated with a particular mobile device that must be present for ticket purchase and redemption/use. This is another way to reduce fraud and maintain control over the ticket market. At decision block it is determined if the user has accepted the terms requiring an associated device. If not, the user exits at step 1309.

If the user accepts the device terms at step 1304, the system proceeds to decision block 1305 to determine if the device to be used for purchase and ticket use is the device on which the user is communicating or purchasing the ticket(s). If not, the system exits at step 1309. If so, the system proceeds to step 1306 and obtains the device parameters. This can include one or more of the phone number, serial number, device ID, UDID, IFA, IDFA, MAC address, IMEI, MEID, ESN, or any other suitable and trustworthy manner of device identification.

At step 1307 the system associates the device parameters with the dynamic link that represents the ticket. At step 1308 the system obtains payment for the ticket and transmits the link to the purchaser.

Secondary Ticket Market

One unsolved, material problem that theatrical and non-theatrical artists, promoters, and exhibitors have is that the secondary ticket market creates income streams for others that bypass those that issue the original tickets (where the original sale of the ticket from the issuer to the first purchaser is considered to be the primary market). In the vernacular, these others are referred to as ticket scalpers. In addition, typical fans are often prevented from getting tickets because of scalpers and brokers buying large blocks of tickets, creating scarcity and driving up the price of tickets on the secondary market. In one embodiment, the system prevents the resale of tickets by associating the dynamic link that represents the ticket with a device used to purchase the ticket, or otherwise associated with the ticket.

In one embodiment, the system provides a marketplace for secondary ticket sales, but it is maintained and controlled by the issuer of the ticket, or under license by the issuer of the ticket, so that sales and purchase on the secondary market benefit the issuer. The secondary market can operate in a stock exchange model, with those desiring to sell tickets setting a price at which they will sell and potential purchasers setting a price at which they will buy. In other embodiments, the secondary market could be a place to post offers to sell and offers to buy where ticket buyers and sellers can browse for offers that appeal to them.

In another embodiment, the issuer of the ticket can set a price at which the issuer will buy back a ticket from a purchaser. The issuer then re-sells the ticket to another buyer. In other instances, buyers and sellers deal directly with each other through the exchange, but some portion of the financial transaction goes to the issuer and not to the seller. This may be a fixed handling fee or it may be a percentage of the selling price, or a percentage of the selling price above the original face value of the ticket.

In another embodiment, a PSN can be established for each event for which a ticket is issued, and each buyer and seller must be a registered member of the PSN to undertake any transaction related to the ticket.

In one embodiment, the technology facilitates a mechanism by which the issuer can control and set limits for purchasing tickets in the secondary market. This precludes the process of haggling for unique prices between the buyer and seller and enables the ticket issuer to determine the scope and scale of the ticket in an orderly, market controlled fashion. Most importantly, with control comes financial participation in the price elasticity for the secondary market. Specifically, the ticket issuer can set the issue price, the secondary market price range, and associated percentages with each one over time.

An additional benefit of the embodiment is the physical security and authentication provided to the ticket buyer. Scalpers are notorious for not following through on their transactions, making ticket purchasers feel unsafe and in some cases, subject themselves to unnecessary physically dangerous situations.

Ticket Use

Figure 14:
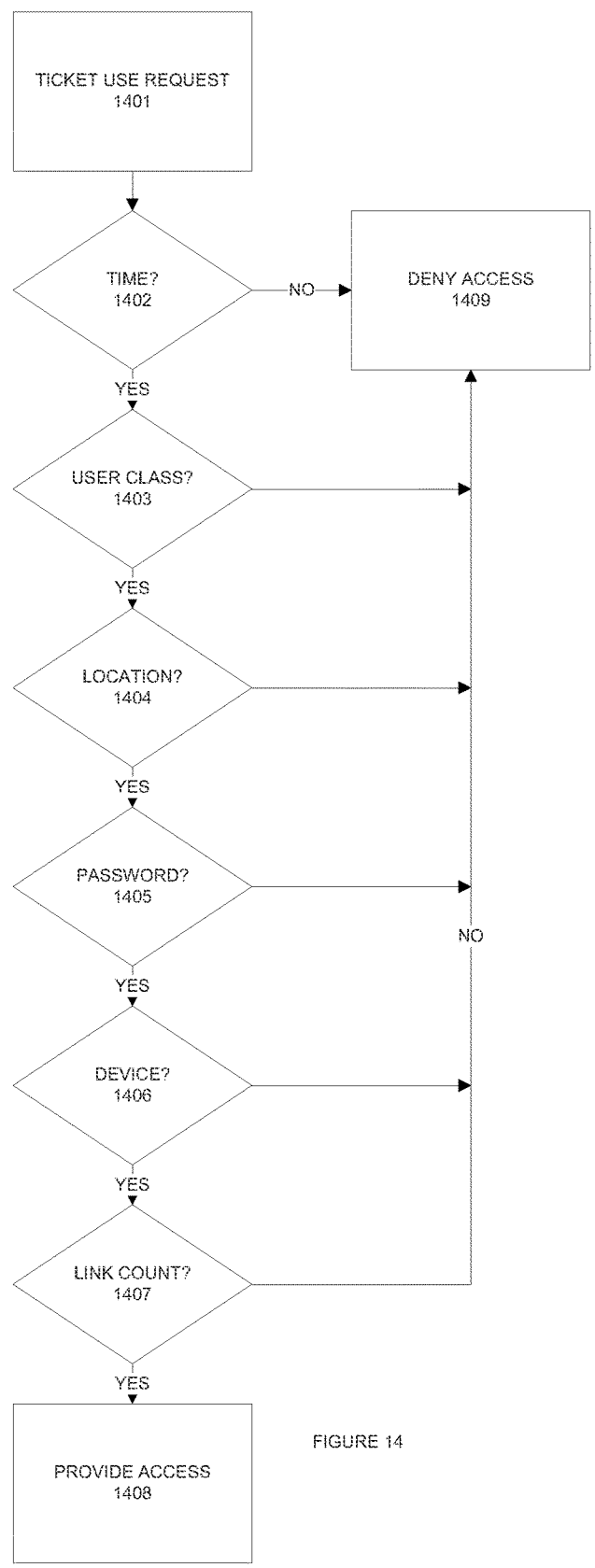
FIG. 14 is a flow diagram illustrating the use of the ticket in one embodiment of the system.

FIG. 14 is a flow diagram illustrating the use of the ticket in one embodiment of the system. At step 1401 someone makes a request use the ticket. Initially the ticket holder will access the dynamic link to access the content that represents the ticket. At decision block 1402 the system determines if the attempt to access the dynamic link is being made during the active time frame of the link. As noted above, this can be a fixed start and end period, or it may be tied to an event or some other time dependent trigger. If the access is not timely, the system denies access at step 1409.

At decision block 1403 the system determines if the ticket holder attempting access is in the approved ticket holder class as determined by the creator of the link. If so, the system proceeds, if not, access is denied. The ticket holder class may be membership in a particular PSN when that condition is set by the ticket issuer. In one embodiment, membership in the PSN is not required and this step would be optional.

At decision block 1404 it is determined if there is a location restriction and if so, if the ticket holder is within the designated geographic location for accessing the link and/or using the ticket. This may be determined by geo-location information provided by the access device of the ticket holder (e.g. smart-phone). At decision block 1405, if there is a password requirement, the system requests it and checks for the proper password. If the password is not correct, the system may provide a certain number of retries. If the ticket holder fails to provide the password, access is denied.

At decision block 1406 it is determined if there is a device requirement for access, and if so, whether the ticket holder is accessing the link on the correct device. This can be determined by IP address, UDID, MAC address, or some other reliable indicator of the device being used. At decision block 1407 it is determined if the access request is within the number of allowed link requests. This number may be on a per-ticket holder limit or a total access limit for the link, as defined by the creator of the link. This is a manner to prevent multiple uses of the ticket. After the first use, the counter is incremented and all subsequent attempts to use the ticket are denied. In one embodiment, the system consults a database to determine if the ticket has already been used and denies entry based on that database check. If the decision blocks are not satisfied, access is denied. If all are satisfied, the system provides access to the link at step 1408.

Fee Based Positioning

Figure 15:
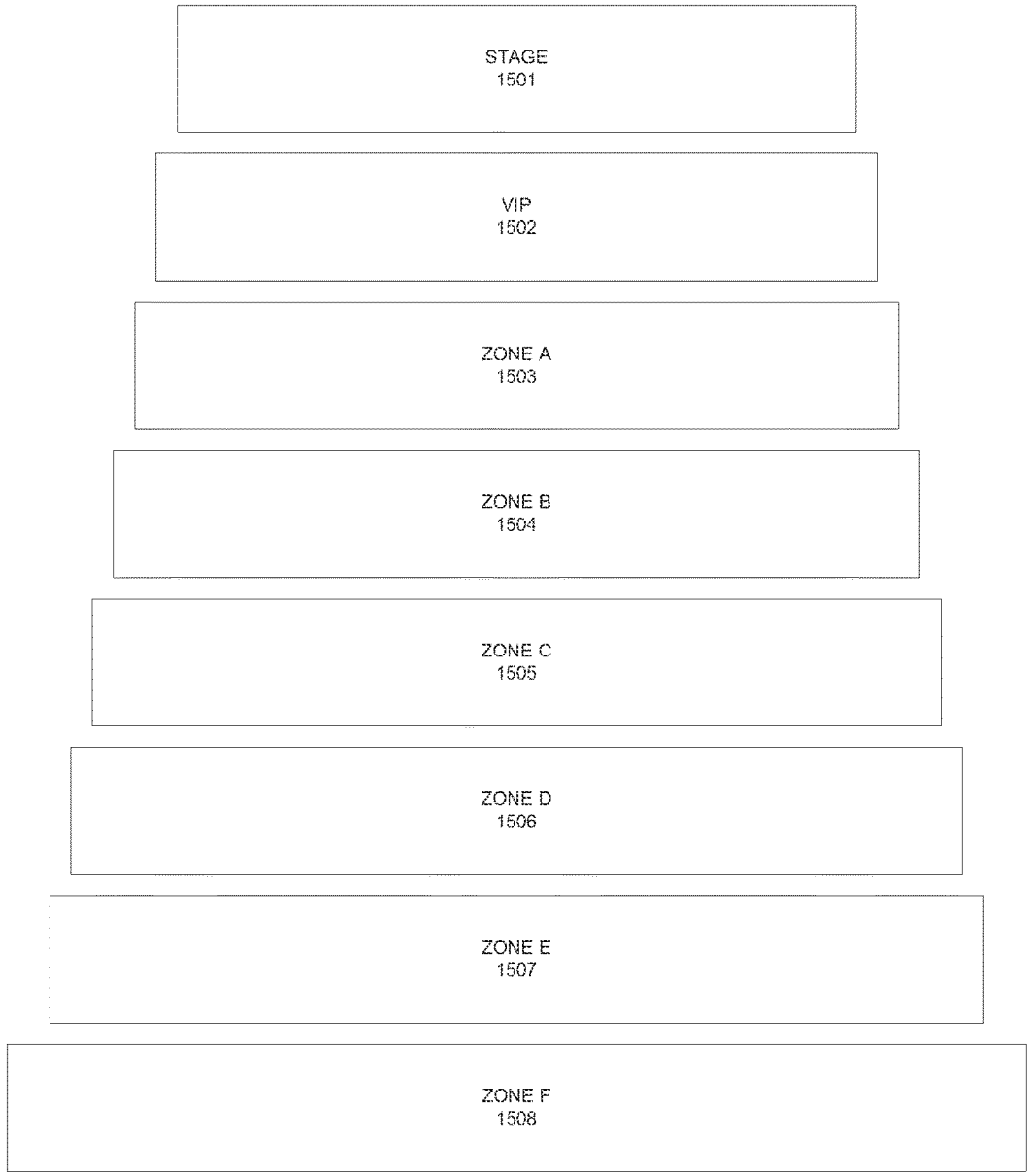
FIG. 15 illustrates a fee based positioning system in one embodiment of the system.

In one embodiment of the system, a ticket holder is tracked by location at an event or venue and is charged based on the position of the ticket holder. The venue may be divided into a plurality of zones with ticket prices charged dynamically based on movement or location of the ticket holder. FIG. 15 illustrates a fee based positioning system in one embodiment of the system. A venue includes a stage 1501 and a plurality of viewing/seating zones 1502-1508. (The number of zones is for purposes of example only, the system may be implemented with more or fewer zones).

Each zone 1502-1508 is defined by its geospatial position and takes advantage of the geo-positioning capabilities of a mobile device to determine where a ticket holder is relative to each zone. Initially a ticket holder chooses a zone and purchases a ticket for that zone. Upon attending the event, the ticket holder is free to advance to closer zones, but if the ticket holder does so, the account of the ticket holder is charged the incremental fee commensurate with the closer zone. For example, if the cost for Zone F 1508 is $10, and the fee for Zone E 1507 is $30, a ticket holder who originally purchased a Zone F ticket and moves to Zone E is charged the difference, e.g. $20 so that their total expenditure equals the ticket price of the new, closer zone. Moving further away from a purchased zone does not decrement the ticket holder's price.

In one embodiment, the system implements a "geo-fence" between each zone to more clearly define the zones and limit the accidental charging of incremental fees. Should a ticket holder deactivate their phone during the event, they are charged the maximum amount per a prior agreement at time of purchase.

Figure 16:
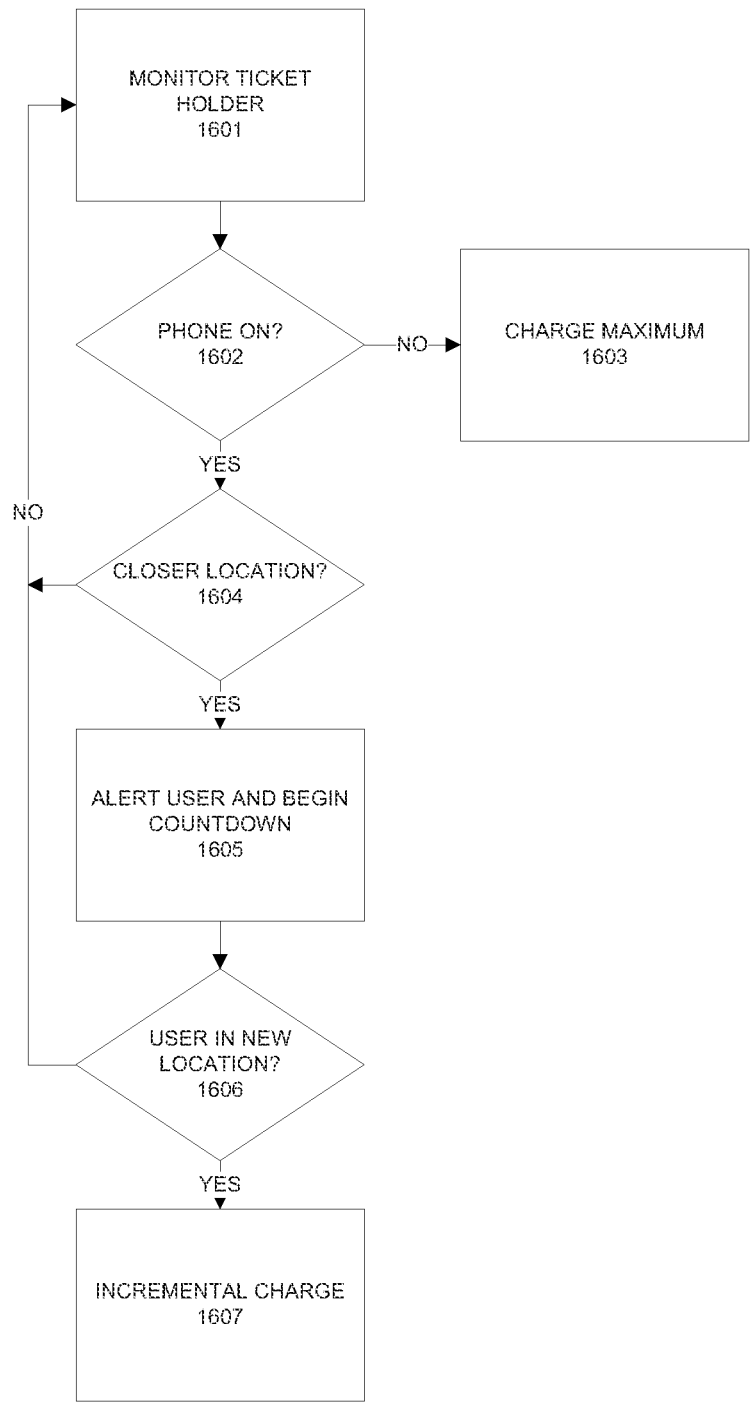
FIG. 16 is a flow diagram illustrating the operation of the fee based position system in one embodiment.

FIG. 16 is a flow diagram illustrating the operation of the fee based position system in one embodiment. At step 1601 the system monitors the ticket holder at the venue. At decision block 1602 it is determined if the mobile device of the ticket holder is on. If not, the system proceeds to step 1603 and charges the ticket holder the maximum amount of the zone prices. If not, the system proceeds to decision block 1604 to determine if the ticket holder has moved to a closer zone than the zone that was purchased.

If the ticket holder has not moved closer, the system returns to step 1601 and continues monitoring the ticket holder. If the ticket holder has moved closer, the system alerts the user of the zone change and begins a countdown to warn the ticket holder that an incremental charge is about to be incurred. This step 1605 is optional and the system may choose to not alert the ticket holder and/or may have an internal countdown timer if desired.

At decision block 1606 it is determined if the user remains in the new location. If so, an incremental charge for the closer zone is charged to the ticket holder account at step 1607. If not, the system returns to step 1601 and continues to monitor the ticket holder.

It should be noted that instead of fixed charges per zone, the system may implement a per time unit charge for each zone so that a ticket holder is only charged for the time they spend in the closer zone (or the incremental difference between the new zone rate and the originally purchased rate). This may be effective where there are a number of acts or presentations, and different ticket holders may desire to be closer for some presentations and not others. In addition, it may be that if the ticket holder leaves the venue, the charged rate may cease or be adjusted pursuant to some agreed upon amount.

Example Computer System

Figure 6:
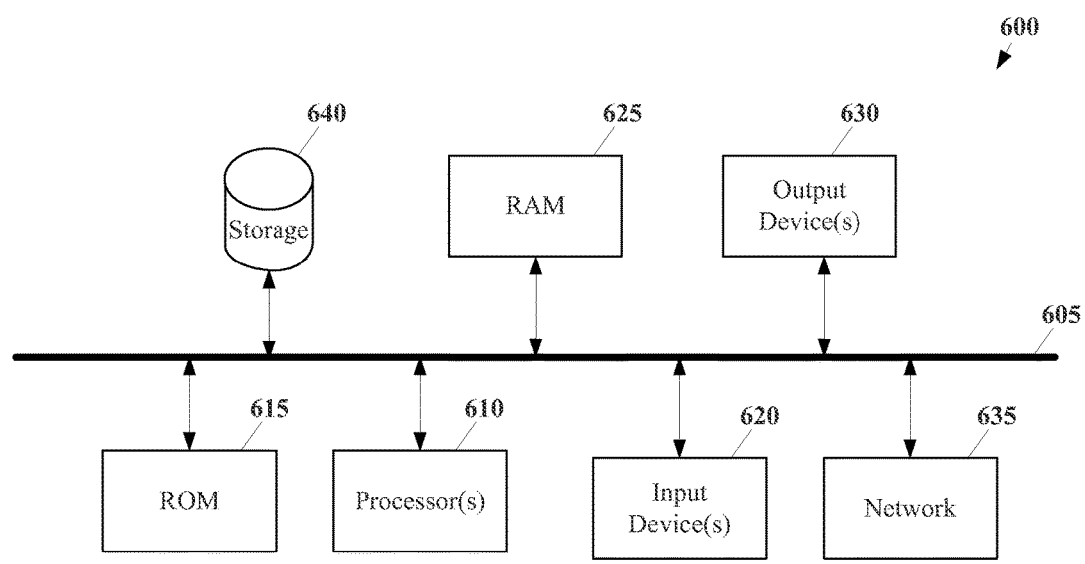
FIG. 6 illustrates an exemplary computer system 600 that may implement the access controller and/or the access control device.

FIG. 6 illustrates an exemplary computer system 600 that may implement the access controller and/or the access control device. The computer system includes various types of computer readable media and interfaces. The system includes a bus 605, processors 610, read only memory (ROM) 615, input device(s) 620, random access memory 625), output device(s) 630, a network component 635, and a permanent storage device 640.

The bus 605 the communicatively connects the internal devices and/or components of the computer system. For instance, the bus 605 communicatively connects the processor(s) 610 with the ROM 615, the RAM 625, and the permanent storage 640. The processor(s) 610 retrieve instructions from the memory units to execute processes of the invention.

The ROM 615 stores static instructions needed by the processor(s) 610 and other components of the computer system. The ROM may store the instructions necessary for the processor to execute the web server, web application, or other web services. The permanent storage 640 is a non-volatile memory that stores instructions and data when the computer system 600 is on or off. The permanent storage 640 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The RAM 125 is a volatile read/write memory. The RAM 625 stores instructions needed by the processor(s) 60 at runtime. The bus 605 also connects input and output devices 620 and 630. The input devices enable the user to communicate information and select commands to the computer system. The input devices 620 may be a keyboard or a pointing device such as a mouse. The input devices 620 may also be a touch screen display capable of receiving touch interactions. The output device(s) 630 display images generated by the computer system. The output devices may include printers or display devices such as monitors.

The bus 605 also couples the computer system to a network 635. The computer system may be part of a local area network (LAN), a wide area network (WAN), the Internet, or an Intranet by using a network interface. The web service may be provided to the user through a web client, which receives information transmitted on the network 635 by the computer system 100.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for" or, in the case of a method claim, the element is recited using the phrase "step for."

What is claimed is:

1. A method of providing a ticket to a ticket holder comprising:
   in a ticket generating processing system;
   defining the rights associated with a ticket;
   determining a device to be associated with the ticket;
   creating a dynamic link to a file that represents the ticket;
   providing the dynamic link to a ticket holder,
   wherein the ticket has a charge that is determined by the location of the user at the ticketed event and the ticket holder is notified if the ticket holder moves to a location that will result in a charge to the ticket holder.

2. The method of claim 1 further including a geolocation limitation on the dynamic link wherein the dynamic link is active in a defined geographic location.

3. The method of claim 1 wherein the ticket cannot be resold without permission of the issuer of the ticket.

4. The method of claim 1 wherein the ticket holder is a member of a private social network.

5. The method of claim 4 wherein the ticket is purchased via the private social network.

6. The method of claim 1 wherein the ticket holder is charged a maximum fee if the device of the ticket holder is not activated during the ticketed event.

7. The method of claim 1 wherein the charge is a rate of price per time period in a location.

8. The method of claim 1 wherein the ticket can be used only once.

9. The method of claim 1 wherein the ticket may be resold in a secondary market with price limits, time limits, and geographical limits defined by a ticket issuer.

10. A method of providing a ticket to a ticket holder comprising:
    in a ticket generating processing system;
    defining the rights associated with a ticket;
    determining a device to be associated with the ticket;
    creating a dynamic link to a file that represents the ticket;
    providing the dynamic link to a ticket holder;
    wherein the ticket may be resold in a secondary market with price limits, time limits, and geographical limits defined by a ticket issuer.

* * * * *